(12) United States Patent
Meschter

(10) Patent No.: US 7,065,820 B2
(45) Date of Patent: Jun. 27, 2006

(54) ARTICLE AND METHOD FOR LASER-ETCHING STRATIFIED MATERIALS

(75) Inventor: James Meschter, Portland, OR (US)

(73) Assignee: Nike, Inc., Beaverton, OR (US)

( * ) Notice: Subject to any disclaimer, the term of this patent is extended or adjusted under 35 U.S.C. 154(b) by 228 days.

(21) Appl. No.: 10/609,010

(22) Filed: Jun. 30, 2003

(65) Prior Publication Data
US 2004/0261295 A1  Dec. 30, 2004

(51) Int. Cl.
A43B 23/00  (2006.01)

(52) U.S. Cl. .......................... 12/146 C; 36/45
(58) Field of Classification Search .............. 36/45; 12/146 C
See application file for complete search history.

(56) References Cited

U.S. PATENT DOCUMENTS

| | | |
|---|---|---|
| 3,790,744 A | 2/1974 | Bowen |
| 3,832,948 A | 9/1974 | Barker |
| 4,271,568 A | 6/1981 | Durville et al. |
| 4,629,858 A | 12/1986 | Kyle |
| 4,847,184 A | 7/1989 | Taniguchi et al. |
| 4,941,093 A | 7/1990 | Marshall et al. |
| 5,010,231 A | 4/1991 | Huizinga |
| 5,017,423 A | 5/1991 | Bossmann et al. |
| 5,185,511 A | 2/1993 | Yabu |
| 5,200,592 A | 4/1993 | Yabu |
| 5,341,157 A | 8/1994 | Campagna et al. |
| 5,567,207 A | 10/1996 | Lockman et al. |
| 5,589,090 A | 12/1996 | Song |
| 5,605,641 A | 2/1997 | Chiba et al. |
| 5,661,744 A | 8/1997 | Murakami et al. |
| 5,702,565 A | 12/1997 | Wu et al. |
| 5,854,751 A | 12/1998 | Di Pietro et al. |
| 5,883,356 A | 3/1999 | Bauer et al. |
| 5,916,461 A | 6/1999 | Costin et al. |
| 5,990,444 A | 11/1999 | Costin |
| 6,002,099 A | 12/1999 | Martin et al. |
| 6,046,427 A | 4/2000 | Richter et al. |
| 6,064,034 A | 5/2000 | Rieck |
| 6,085,122 A | 7/2000 | Manning |
| 6,140,602 A * | 10/2000 | Costin ................ 219/121.68 |
| 6,252,196 B1 | 6/2001 | Costin et al. |
| 6,299,962 B1 * | 10/2001 | Davis et al. ............ 12/142 P |
| 6,315,202 B1 | 11/2001 | Costin et al. |
| 6,492,616 B1 | 12/2002 | Tanaka et al. |
| 6,495,237 B1 | 12/2002 | Costin |

(Continued)

FOREIGN PATENT DOCUMENTS

DE    3916126    11/1990

(Continued)

OTHER PUBLICATIONS

International Search Report in corresponding PCT application, application No. PCT/US2004/016615, mailed Nov. 5, 2004.

(Continued)

Primary Examiner—Ted Kavanaugh
(74) Attorney, Agent, or Firm—Banner & Witcoff, Ltd.

(57) ABSTRACT

A method for utilizing a laser to etch a stratified material is disclosed. The method includes providing a stratified material having at least two layers that are secured together, the layers including a first layer and a second layer. An incision is then formed in the stratified material with a laser, the incision extending through the first layer to expose the second layer. The stratified material may then be incorporated into an upper of the article of footwear, for example. By exposing portions of the second layer, properties of the second layer may be exposed in the area of the removed first layer.

35 Claims, 10 Drawing Sheets

U.S. PATENT DOCUMENTS

| | | |
|---|---|---|
| 6,509,546 B1 | 1/2003 | Egitto et al. |
| 6,633,019 B1 * | 10/2003 | Gray .................... 219/121.69 |
| 2001/0055684 A1 | 12/2001 | Davis et al. |
| 2002/0078594 A1 * | 6/2002 | Sedlbauer .................. 36/25 R |
| 2003/0107203 A1 | 6/2003 | Bauer et al. |

FOREIGN PATENT DOCUMENTS

| | | |
|---|---|---|
| FR | 2575114 | 6/1986 |
| FR | 2 698 302 | 11/1993 |
| GB | 2 294 656 | 5/1996 |
| JP | 59106589 | 6/1984 |
| JP | 1-95885 | 4/1989 |
| SU | 1717679 | 3/1992 |
| WO | WO 00/46045 | 8/2000 |
| WO | WO 01/15916 | 3/2001 |

OTHER PUBLICATIONS

Synrad, "Fenix Laser Marker", Operator's Manual, Oct. 2000, Version 2.0, Mukilteo, Washington.

* cited by examiner

ARTICLE AND METHOD FOR LASER-ETCHING STRATIFIED MATERIALS

BACKGROUND OF THE INVENTION

1. Field of the Invention

The present invention relates to techniques for etching stratified materials with a laser. The invention concerns, more particularly, a method for forming incisions in a stratified material to affect physical or aesthetic properties of the stratified material. The invention has application, for example, to stratified materials that are utilized to form footwear uppers.

2. Description of Background Art

Conventional articles of athletic footwear generally include two primary elements, an upper and a sole structure. The upper is secured to the sole structure and forms a void on the interior of the footwear for comfortably and securely receiving a foot. The sole structure is positioned between the foot and the ground to attenuate ground reaction forces and absorb energy as the footwear contacts the ground. Accordingly, the upper and sole structure operate in concert to position the foot relative to the ground and to protect the foot.

The upper generally extends over the instep and toe areas of the foot, along the medial and lateral sides of the foot, and around the heel area of the foot. Access to the void on the interior of the footwear is generally provided by an ankle opening. A lacing system is often incorporated into the upper to selectively increase the size of the ankle opening and permit the wearer to modify certain dimensions of the upper, particularly girth, to accommodate feet with varying dimensions. In addition, the upper may include a tongue that extends under the lacing system to enhance the comfort of the footwear, and the upper may include a heel counter to limit movement of the heel.

Various materials may be utilized in manufacturing the upper. The upper of athletic footwear, for example, may be formed from multiple material layers that include an exterior layer, a middle layer, and an interior layer. The materials forming the exterior layer of the upper may be selected based upon the properties of wear-resistance, flexibility, and air-permeability, for example. With regard to the exterior layer, the toe area and the heel area may be formed of leather, synthetic leather, or a rubber material to impart a relatively high degree of wear-resistance. Leather, synthetic leather, and rubber materials may not exhibit the desired degree of flexibility and air-permeability. Accordingly, various other areas of the exterior layer of the upper may be formed from a synthetic textile. The exterior layer of the upper may be formed, therefore, from numerous material elements that each impart different properties to the upper.

A middle layer of the upper may be formed from a lightweight polymer foam material that provides cushioning and protects the foot from objects that may contact the upper. Similarly, an interior layer of the upper may be formed of a moisture-wicking textile that removes perspiration from the area immediately surrounding the foot. In some articles of athletic footwear, the various layers may be joined with an adhesive, and stitching may be utilized to join elements within a single layer or to reinforce specific areas of the upper.

Based upon the above discussion, the conventional upper is formed from multiple layers, and each layer may be formed from multiple material elements. In manufacturing the upper, the specific materials utilized for each layer and element are selected and then cut to a predetermined shape. Considerable effort is then expended in joining the various elements together, particularly the various material elements forming the exterior layer of the upper.

SUMMARY OF THE INVENTION

The present invention is an article of footwear having an upper and a sole structure secured to the upper. The upper is formed of a stratified material having at least a first layer and a second layer. The first layer forms an exterior of the upper, and the first layer is laser-etched to form a removed portion of the first layer that exposes the second layer. Accordingly, a portion of the first layer is removed from the stratified material by laser-etching to expose an underlying portion of the second layer.

The first layer and the second layer may have different properties that relate to color, abrasion-resistance, durability, air-permeability, flexibility, and stretch-resistance. With regard to color, for example, removing a portion of the first layer will expose the color of the second layer, thereby modifying the properties of the stratified material. Similarly, the first layer may have high stretch-resistance, and the second layer may be stretchable. By removing a portion of the first layer, the stretchable properties of the second layer become exposed in the area of the removed material.

A laser apparatus is utilized to direct a laser at the stratified material and form an incision in the stratified material that extends through the first layer. The incision alone may be utilized to expose a portion of the second layer. Alternately, the incision may be utilized to segregate two portions of the first layer, and then one of the segregated portions may be detached from the second layer and removed, thereby exposing an area of the second layer. In embodiments where the stratified material has a third layer, or even additional layers, the power of the laser may be adjusted such that the laser may form incisions through a selected number of layers.

The invention also includes a method for manufacturing an article of footwear. The method includes providing a stratified material having at least two layers that are secured together, the layers including a first layer and a second layer. An incision is then formed in the stratified material with a laser, the incision extending through the first layer to expose the second layer. The stratified material is then incorporated into an upper of the article of footwear.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The following discussion and accompanying figures disclose a method of laser-etching a stratified material in accordance with the present invention. The laser-etching method is utilized to form incisions in the stratified material. The incisions extend through an exterior layer of the stratified material, and the incisions may extend through one or more underlying layers of the stratified material. The incisions alone may be utilized to remove material and expose the underlying layers. Alternately, material that is segregated as a result of the incisions may be removed to expose the underlying layers. By exposing the underlying layers, the properties of the underlying layers are revealed and the overall properties of the stratified material are modified.

The method disclosed below may be applied to a variety of stratified materials, including laminate materials. As utilized herein, stratified materials exhibit one or more properties that vary through at least a portion of a thickness of the material. Accordingly, the surface portion of the stratified material may have different properties than an interior portion of the stratified material. That is, the properties of the stratified material change with respect to the depth of the material. The manner in which the properties change with respect to the depth may also vary within the scope of the present invention. For example, the properties may change gradually throughout the depth to provide a property gradient. In other words, a material with gradually increasing density throughout the depth of the material is considered a stratified material. In addition, the properties may change at discrete layers within the stratified material. For example, a first layer may have a consistent green color, and a second layer may have a consistent yellow color such that the stratified material has discrete layers with different properties. As utilized herein, a stratified material having discrete layers with different properties will be referred to as a laminate material.

The method of the present invention is suitable for use with a plurality of stratified materials, and the resulting laser-etched stratified materials may be incorporated into a diverse range of products. For purposes of example, however, the following discussion discloses the laser-etching method in the form of a footwear upper. Accordingly, the laser-etching method may be employed in forming the footwear upper. The present invention is not limited to footwear uppers, however, and may be applied to a wide range of other products.

Figure 1:
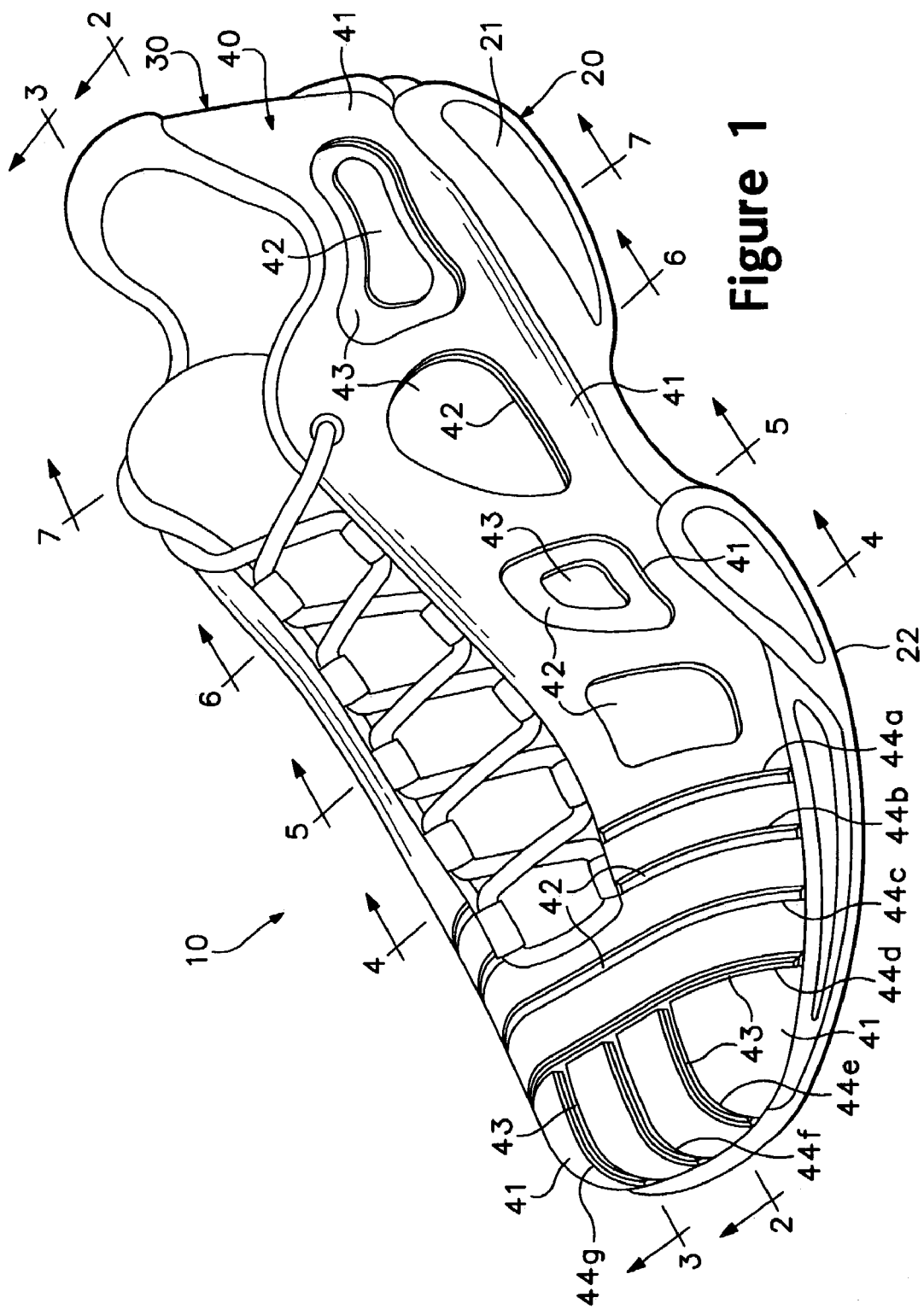
FIG. 1 is a perspective view of an article of footwear in accordance with the present invention.

An article of footwear 10 is depicted in FIG. 1 and has the general configuration of footwear that is utilized during athletic activities. The primary elements of footwear 10 are a sole structure 20 and an upper 30. Sole structure 20 may have a conventional configuration and is depicted as including a midsole 21 and an outsole 22. Midsole 21 is the primary shock attenuation and energy absorbing element of footwear 10, and may be formed of a polymer foam, such as ethylvinylacetate or polyurethane foam. Outsole 22 is adhesively-secured to a lower surface of midsole 21 and provides the primary ground-contacting element of footwear 10. Accordingly, outsole 22 is formed of a durable, wear-resistant material such as carbon black rubber compound and may include texturing to enhance traction. Sole structure 20 also includes an insole 23 that is located within upper 30 to enhance the comfort of footwear 10.

Upper 30 is secured to sole structure 20 in a conventional manner and forms a hollow structure or void for comfortably and securely receiving a foot. The material forming upper 30 is configured to extend over medial and lateral sides of the foot, an instep area of the foot, and a toe area of the foot. Furthermore, the material forming upper 30 is configured to extend around the heel area of the foot. A plurality of apertures may be formed in instep portion of upper 30, and a lace may extend through the apertures to assist with adjusting the fit of footwear 10. A heel counter formed of a semi-rigid polymer material, for example, may also be positioned within the heel area to ensure that the heel remains properly positioned with respect to upper 30.

Based upon the above discussion, upper 30 has a the general structure of a conventional upper. In contrast with the conventional upper, however, upper 30 is primarily formed of a stratified material 40 having a plurality of layers that are selectively laser-etched. That is, various incisions are formed in stratified material 40 to expose underlying layers of stratified material 40. By exposing the underlying layers, the properties of stratified material 40, and thereby the properties of upper 30, may be selectively modified. Accordingly, the incisions formed in stratified material 40 are utilized to selectively vary the properties of stratified material 40 in specific portions of upper 30. Potential properties of stratified material 40 that may be varied by laser-etching include color, abrasion-resistance, durability, air-permeability, flexibility, and stretch-resistance, for example. Stratified material 40 is depicted and discussed herein as having a layered configuration, and stratified material 40 is, therefore, a laminate material. Stratified material 40 may, however, have gradually changing properties.

The number of layers forming stratified material 40 may vary significantly within the scope of the present invention, and may be in the range of two to ten layers, for example. For purposes of discussion, stratified material 40 is depicted in the figures and discussed herein as having a first layer 41, a second layer 42, and a third layer 43. Layers 41–43 are arranged such that first layer 41 forms an exterior layer of stratified material 40, layers 42 and 43 form underlying layers of stratified material 40, and second layer 42 is positioned between first layer 41 and third layer 43. With respect to upper 30, first layer 41 is positioned on an exterior of upper 30, and third layer 43 is positioned on an interior of upper 30 and adjacent to the void within upper 30. The use of three layers 41–43 is intended to be illustrative only, and is not intended to limit the scope of the present invention.

Layers 41–43 are each formed from materials with different properties. The different properties may include abrasion-resistance, durability, air-permeability, flexibility, and stretch-resistance, for example. For purposes of the following discussion, however, the, different properties relate to color. Accordingly, stratified material 40 may be formed such that first layer 41 is green, second layer 42 is yellow, and third layer 43 is red, for example. Incisions may be formed in layers 41–42 in order to selectively vary the colors of stratified material 40 in the area of the incisions. For example, an incision may be formed in first layer 41 to remove a portion of first layer 42 and reveal the yellow color of second layer 42. Similarly, an incision may be formed in layers 41 and 42 to remove portions of layers 41 and 42 and reveal the red color of third layer 43. Alternately, the incisions may be utilized to segregate portions of first layer 41, and the segregated portions may be removed to expose the underlying layers. In effect, therefore, the incisions are utilized to remove material from layers 41 and 42, thereby revealing the colors associated with layers 42 and 43. Accordingly, removing material from layers 41 and 42 exposes the underlying material of layers 42 and 43 and also exposes the corresponding properties of the underlying material.

Figure 2:
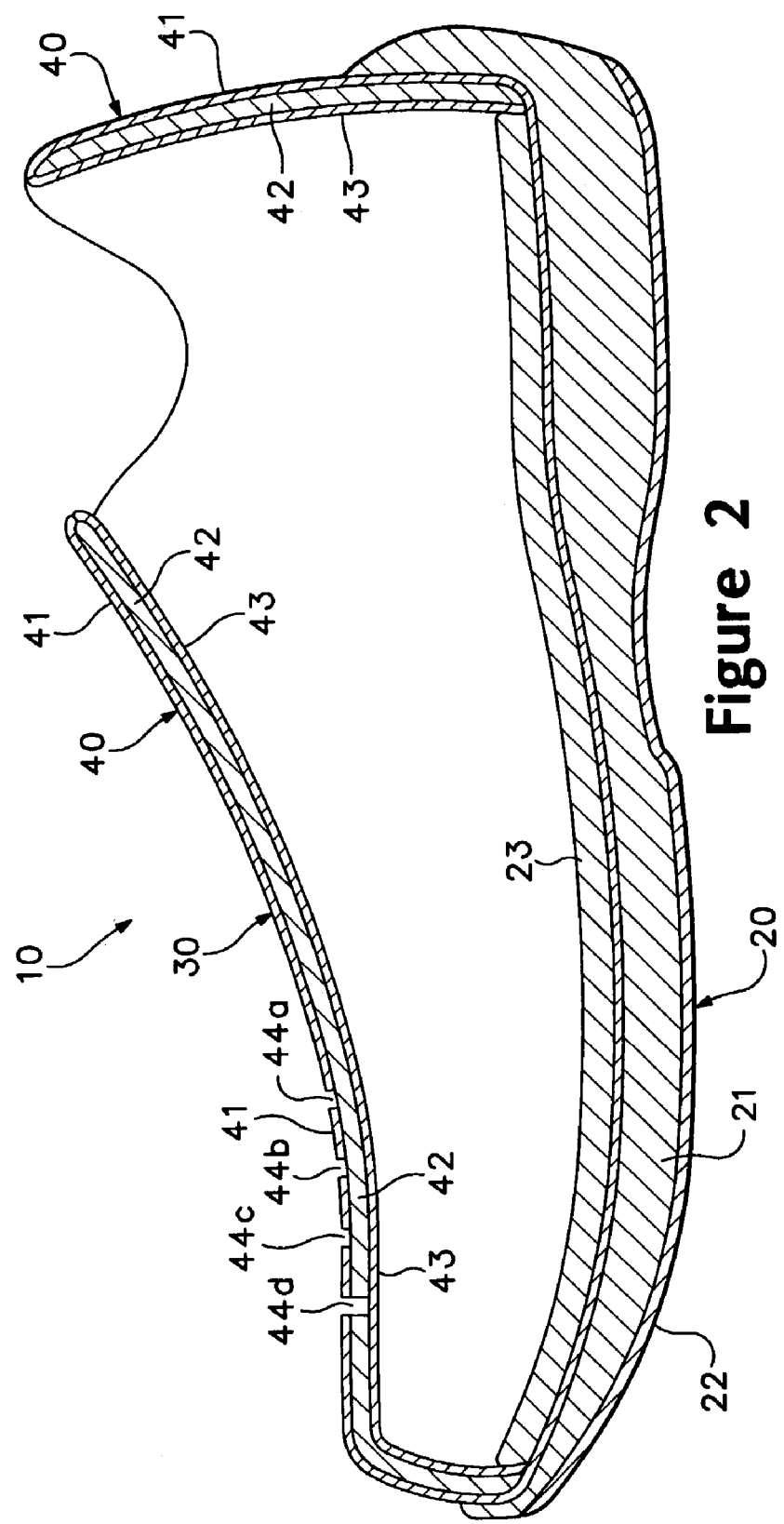
FIGS. 2–7 are various cross-sectional views of the article of footwear, as defined by section lines 2 through 7, respectively, in FIG. 1.
Figure 3:
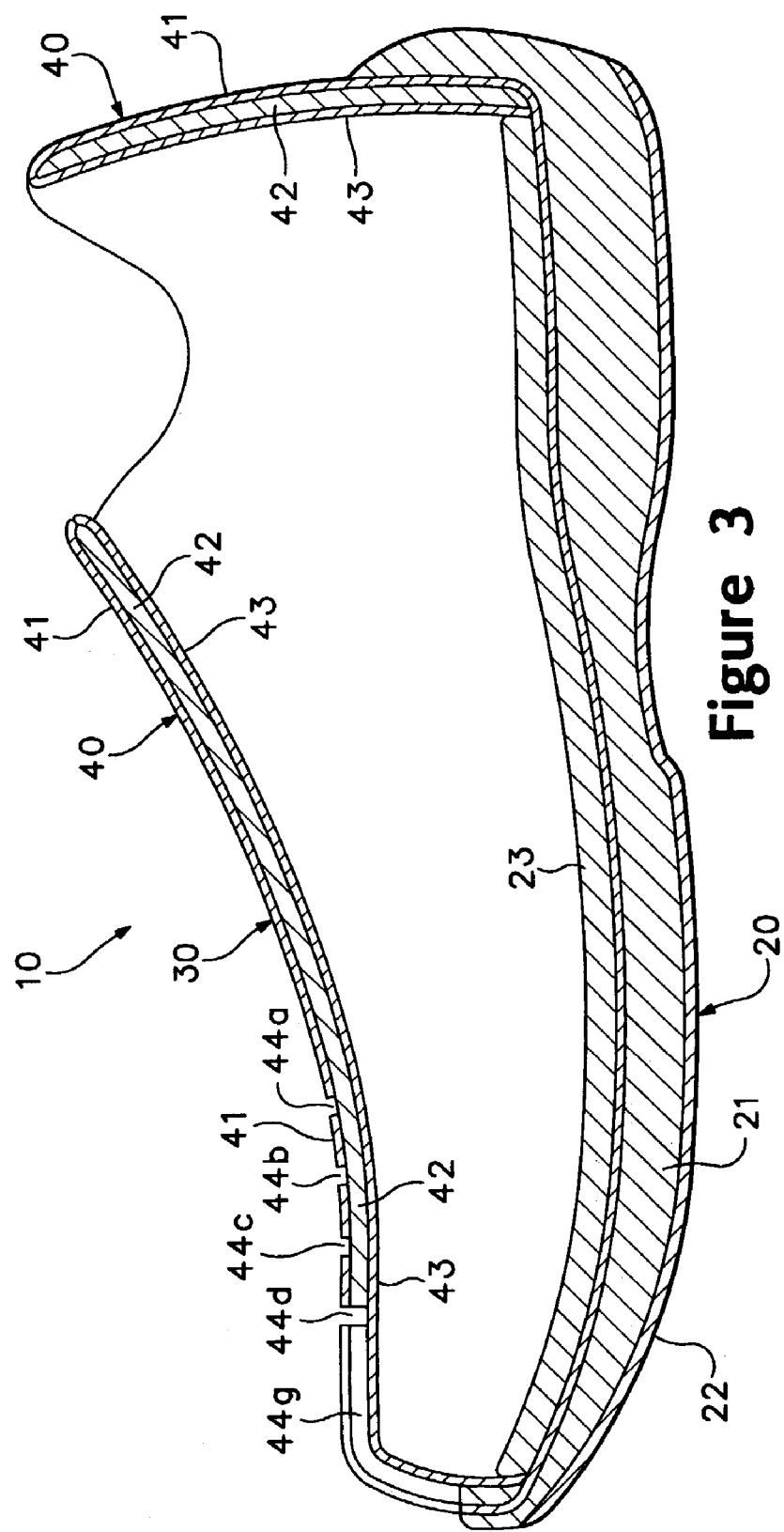

A plurality of incisions 44a–44g are formed in the toe area of upper 30, as depicted in the cross-sections of FIGS. 2 and 3. Incisions 44a–44g represent portions of stratified material 40 that are removed as a result of laser-etching to expose underlying portions of layers 42 and 43. The depth of incisions 44a–44g varies such that either second layer 42 or third layer 43 is exposed. More specifically, incisions 44a–44c have a depth that extends through first layer 41, thereby exposing the yellow color of second layer 42. Similarly, incisions 44d–44g have a depth that extends through first layer 41 and second layer 42, thereby exposing the red color of third layer 43.

In general, incisions 44a–44g are formed by directing a laser at stratified material 40 to remove the portions of stratified material 40 that correspond with incisions 44a–44g, as described in greater detail below. The width of incisions 44a–44g may approximately correspond, therefore, with the width of the laser. Alternately, multiple passes of the laser may be utilized to form incisions 44a–44g with a greater width. Incisions 44a–44g are depicted as having a relatively straight configuration. Within the scope of the present invention, however, incisions 44a–44g may exhibit a straight or curved configuration, for example.

Figure 4:
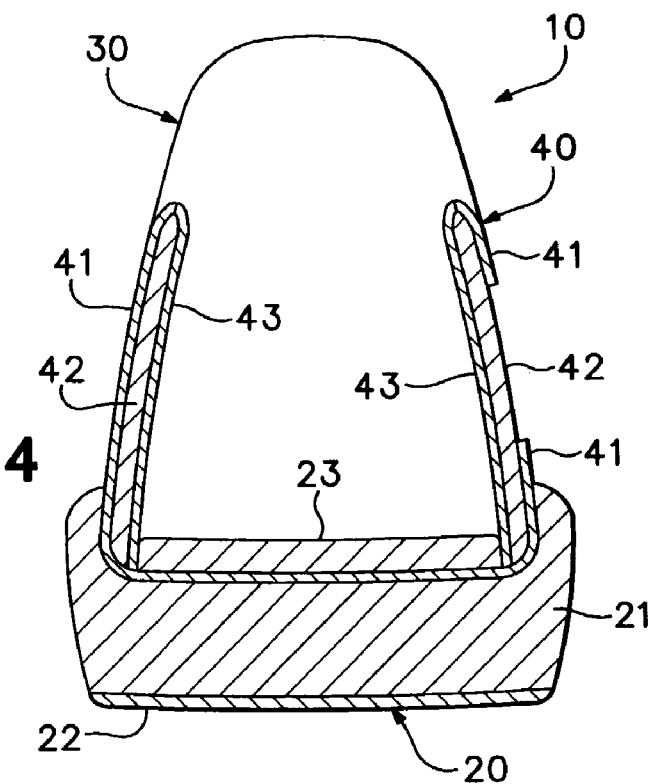

Forming incisions in stratified material 40 is one general method by which underlying portions of layers 42 and 43 may be exposed. Various areas of first layer 41 and second layer 42, as depicted in FIG. 1, may also be removed. Referring to FIG. 4, a cross-section defined in FIG. 1 and through footwear 10 is depicted. An area of first layer 41 is removed from stratified material 40 to expose an underlying portion of second layer 42, thereby exposing the yellow color of second layer 42. Whereas incisions 44a–44g have a linear configuration, the area of first layer 41 that is removed has dimensions that are significantly greater than the width of the various incisions 44a–44g.

The removed area of first layer 41 is formed by laser-etching an incision in first layer 41. The incision segregates the portion of first layer 41 that becomes the removed area from a remainder of first layer 41. The segregated portion of first layer 41 is then separated from second layer 41 and removed, thereby exposing the yellow color of second layer 42. This process effectively forms the removed area of first layer 41 depicted in the cross-section of FIG. 4. This general process will be described in greater detail below.

Figure 5:
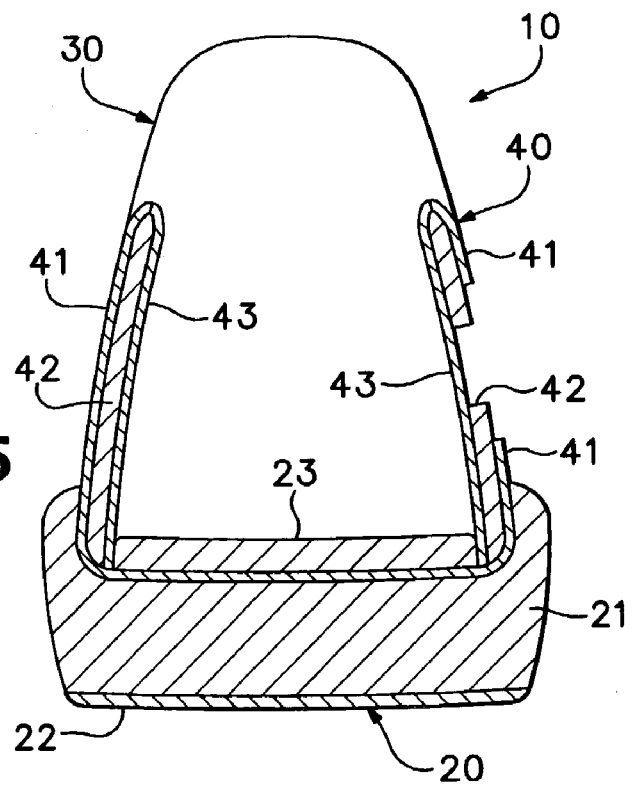

The structure of the removed area discussed relative to FIG. 4 included only a portion of first layer 41. The same general procedure that formed the removed area in first layer 41 may also be utilized to form a removed area in second layer 42, thereby exposing the red color of third layer 43. Referring to FIG. 5, another cross-section defined in FIG. 1 and through footwear 10 is depicted. An area of first layer 41 is removed from stratified material 40 to expose an underlying portion of second layer 42. In addition, an area of second layer 42 is also removed to expose an underlying portion of third layer 43. The removed area of first layer 41 exposes second layer 42 and the yellow color of second layer 42. Similarly, the removed area of second layer 42 exposes third layer 43 and the red color of third layer 43. The edge of first layer 41 that forms the removed area of first layer 41 is spaced away from the edge of second layer 42 that forms the removed area of second layer 42. Accordingly, stratified material 40 exhibits a stepped configuration due to the removed areas of first layer 41 and second layer 42.

The removed areas of first layer 41 and second layer 42 are formed by laser-etching a first incision in first layer 41 and then laser-etching a second incision in second layer 42. The first incision segregates the portion of first layer 41 that becomes the removed area from a remainder of first layer 41. The segregated portion of first layer 41 is then separated from second layer 41 and removed, thereby exposing the yellow color of second layer 42. Subsequently, the second incision is utilized to segregate the portion of second layer 42 that becomes the removed area from a remainder of second layer 42. The segregated area of second layer 42 is then separated from third layer 43 and removed, thereby exposing the red color of third layer 43. This process effectively forms the removed areas of first layer 41 and second layer 42, as depicted in the cross-section of FIG. 5. This general process will be described in greater detail below.

Figure 6:
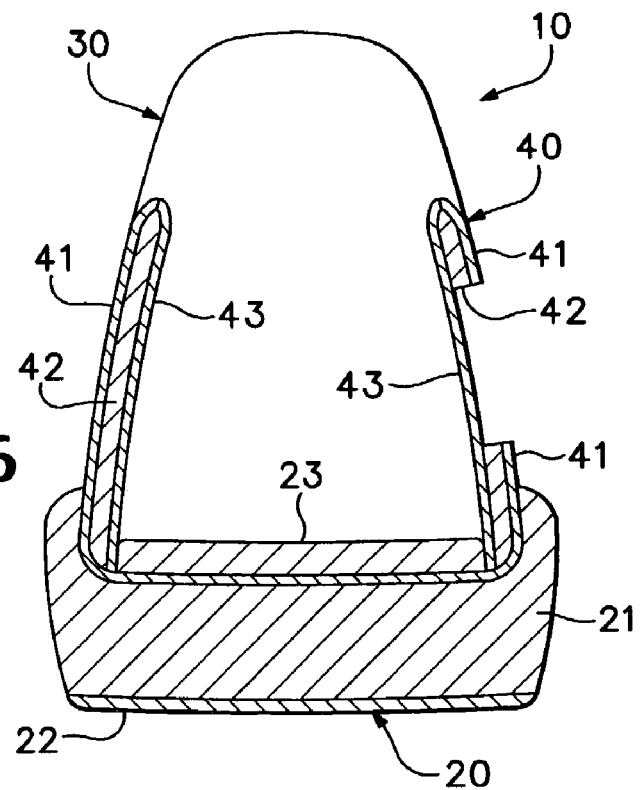

The structure of the removed areas depicted in FIG. 5 exhibited a stepped configuration due to the two separate incisions that are formed in first layer 41 and second layer 42. The laser may also be utilized to form a single incision that extends through first layer 41 and second layer 42. Referring to FIG. 6, another cross-section defined in FIG. 1 through footwear 10 is depicted. An area of first layer 41 is removed from stratified material 40, and a similarly dimensioned area of second layer 42 is also removed from stratified material 40. The edge of first layer 41 that forms the removed area substantially coincides, therefore, with the edge of second layer 42 that also forms the removed area. Accordingly, only the red color of third layer 43 is exposed.

The removed area of first layer 41 and the removed area of second layer 42 are formed by laser-etching a single incision that extends through first layer 41 and second layer 42. The portions of first layer 41 and second layer 42 that are within the boundaries of the incision are then separated from third layer 43 and removed, thereby exposing the red color of third layer 43. This process effectively forms the removed areas of first layer 41 and second layer 42 depicted in the cross-section of FIG. 6. This general process will be described in greater detail below.

Figure 7:
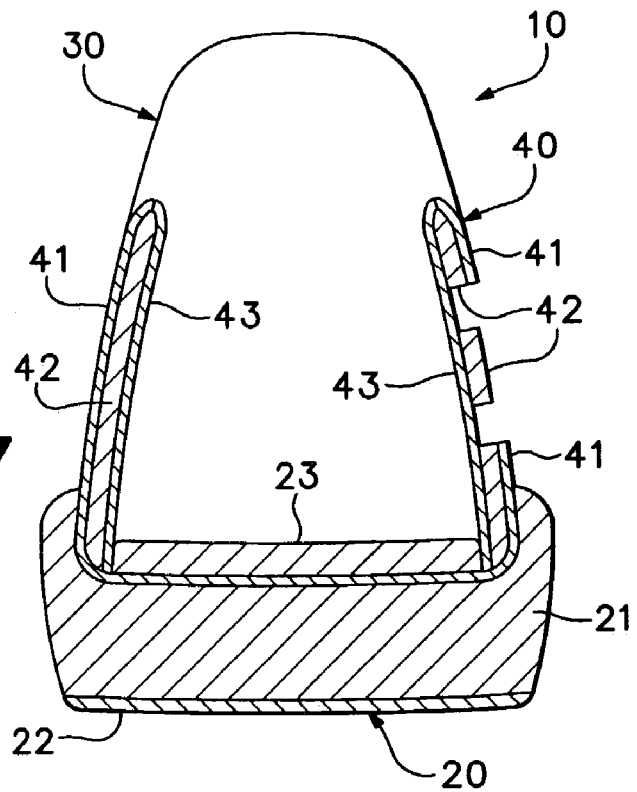

Another cross-sectional view defined in FIG. 1 and through footwear 10 is depicted in FIG. 7, in which areas of first layer 41 and second layer 42 are removed. In contrast with FIG. 6, however, a portion of second layer 42 remains secured to third layer 43. The removed area of first layer 41 is formed by laser-etching an incision that extends through first layer 41, and then the portion of first layer 41 within the incision is separated from second layer 42. An incision having the same dimensions is then formed in second layer 42, and another concentric incision is also formed in second layer 42. The area of second layer 42 that is between the two incisions is then separated from third layer 43, thereby exposing the red color of third layer 43 and leaving a portion of second layer 42 on top of the exposed portion of third layer 43.

FIGS. 4–7 depict four possible configurations for removed areas of first layer 41 and second layer 42. For example, only portions of one layer may be removed, portions of two layers may be removed to form a stepped configuration, portions of two layers may be removed such that edges of the layers coincide, and portions of two layers may be removed so as to leave a portion of one of the removed layers within the removed area. One skilled in the relevant art will recognize that a plurality of other configurations for removing material will also fall within the scope of the present invention.

The method by which material may be removed from stratified material 40 will now be discussed in greater detail. In general, a laser is utilized to form incisions in stratified material 40. The incisions may have a depth that extends only through first layer 41 or through both first layer 41 and second layer 42. In order to form lines of removed material, as disclosed with reference to incisions 44a–44g of FIGS. 2 and 3, the laser is utilized to merely form incisions to a prescribed depth. In order to form areas of removed material, as disclosed with reference to FIGS. 4–7, portions of stratified material 40 that are within an incision may be separated from an underlying layer.

Figure 8:
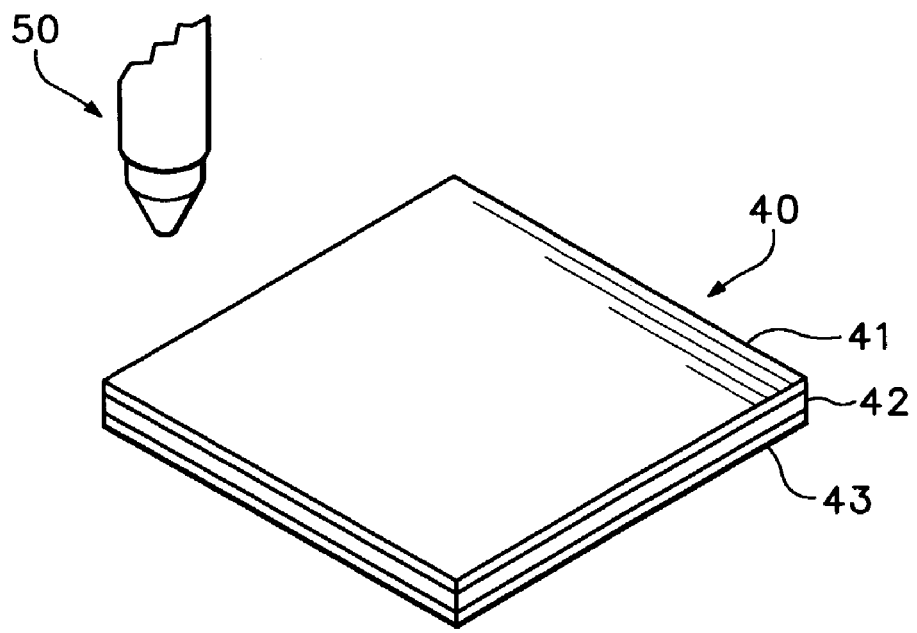
FIGS. 8–17 are various schematic perspective views of a laser apparatus and a stratified material in accordance a method of the present invention.

Referring to FIG. 8, a portion of stratified material 40 and a laser apparatus 50 are depicted. Stratified material 40 includes first layer 41, second layer 42, and third layer 43, as discussed above. Laser apparatus 50 has the capacity to produce a laser beam 51 of variable intensity that is capable of forming an incision in stratified material 40 to a prescribed depth. More particularly, laser apparatus 50 may adjust the power of laser beam 51 to form an incision that extends through first layer 41 or through both first layer 41 and second layer 42. In addition to adjusting the power of laser beam 51 in order to vary the depth of the incision, the focus of laser beam 51 and the velocity of laser beam 51 relative to stratified material 40 may be varied. An example of a suitable laser apparatus 50 is any of the conventional $CO_2$ or Nd:YAG laser apparatuses, as disclosed in U.S. Pat. Nos. 5,990,444 and 6,140,602 to Costin.

Figure 9:
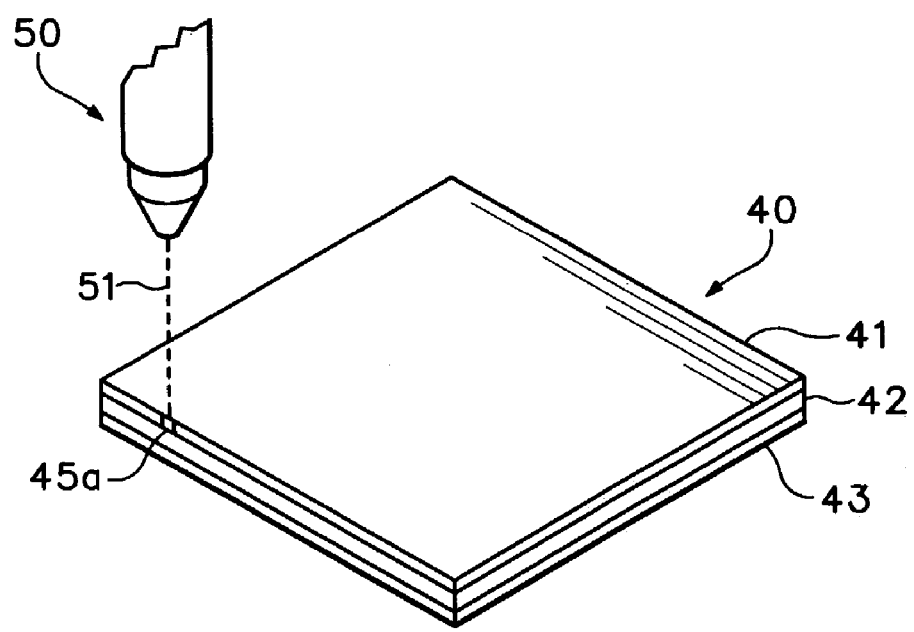
Figure 10:
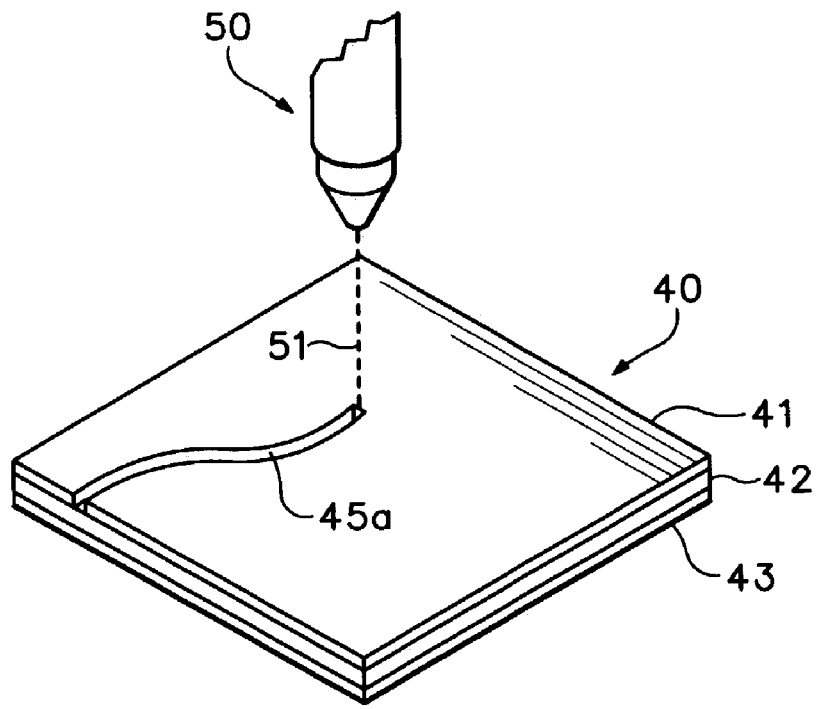
Figure 11:
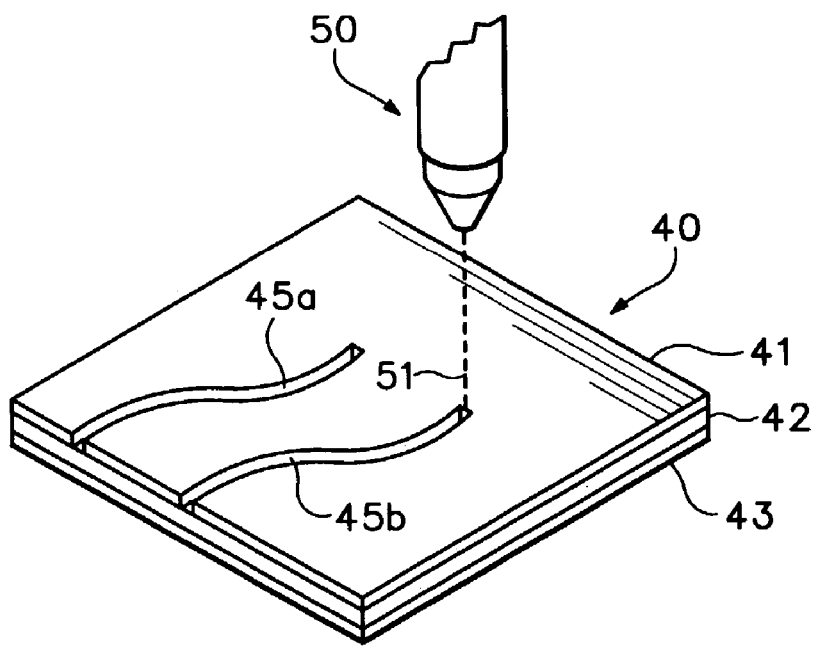

Laser apparatus 50 directs laser beam 51 toward stratified material 40 to begin forming an incision 45a in stratified material 40, as depicted in FIG. 9. Laser apparatus 50 then moves laser beam 51 relative to stratified material 40 to extend the incision through the desired portions of stratified material 40, as depicted in FIG. 10. Incision 45a has a depth that extends only through first layer 41, thereby exposing second layer 42. Referring to FIG. 11, however, an incision 45b may also be formed in stratified material 40 with a depth that extends through both first layer 41 and second layer 42 to expose third layer 43. Accordingly, laser apparatus 50 may be configured to form incisions of various depths in stratified material 40. Furthermore, laser apparatus 50 may be utilized to form incisions with varying depths. For example, a first portion of incision 45a may only extend through first layer 41, and a second portion of incision 45a may extend through both of first layer 41 and second layer 42. In order to form incisions with variable depth, the power, focus, and/or velocity of laser beam 51 may be varied while forming incision 45a.

Factors that determine the depth of incision 45a include the power output of laser apparatus 50, the focus of laser beam 51, the velocity of laser beam 51 relative to stratified material 40, and the specific materials forming stratified material 40. For materials such as synthetic leather, leather, polymer sheets, and polymer textiles, which are often incorporated into footwear uppers, the power of laser beam 51 is generally in a range of 0.25 to 25 watts, for example. If laser beam 51 has a relatively narrow focus, the power of laser beam 51 may be decreased to account for the greater energy per unit area in laser beam 51. Similarly, if laser beam 51 has a relatively wide focus, the power of laser beam 51 may be increased to account for the lesser energy per unit area in laser beam 51. The velocity of laser beam 51 also affects the depth of incision 45a. If laser beam 51 is directed to a specific portion of stratified material 40 for a relatively short period of time, then the depth of incision 45a will be relatively shallow. If, however, laser beam 51 is directed to the specific portion of stratified material 40 for a relatively long period of time, then the depth of incision 45a will be greater. The velocity of laser beam 51 relative to stratified material 40 is generally determinative of the time period that laser beam 51 is directed toward a specific portion of stratified material 40. Finally, the composition of layers 41–43 affect the depth of incision 45a. Whereas materials such as leather, synthetic leather, and polymer textiles may require a relatively small power to form incision, 45a, other materials such as high-density polymers and metals may require greater power to form incision 45a to the same depth. Accordingly, many factors are considered in determining the proper power, focus, and/or velocity of laser beam 51 for forming incision 45a to a prescribed depth.

Laser apparatus 50 may include an emitter for laser beam 51 that moves adjacent to stratified material 40 and forms the incisions in stratified material 40. That is, the shape of the various incisions may be controlled by movements of laser apparatus 50 relative to stratified material 40. Alternately, laser beam 51 may reflect off of one or more movable or pivotable mirrors, and the shape of the incisions in stratified material 40 may be controlled by movements of the mirrors.

Laser beam 51 heats selected areas of stratified material 40 and forms incisions 45a and 45b by burning or incinerating the selected areas of stratified material 40. In order to prevent other areas of stratified material 40 from unintentionally burning, incisions 45a and 45b may be formed in the presence of a non-combustible fluid, such as carbon dioxide or nitrogen. That is, laser apparatus 50 may be configured to emit a non-combustible fluid when laser beam 51 is forming incisions 45a and 45b.

The disclosure of footwear 10 above included a discussion of various incisions 44a–44g that were formed in upper 30. The general technique utilized to form incisions 45a and 45b may also be utilized to form incisions 44a–44g. Prior to incorporating stratified material 40 into footwear 10, stratified material 40 is arranged in a planar configuration, as in FIG. 8. Laser apparatus 50 is then utilized to form three parallel incisions that correspond with the positions of incisions 44a–44c, which were disclosed as having a depth that extended only through first layer 41. Accordingly, incisions 44a–44c may be formed by making three parallel incisions that are similar to incision 45a. Laser apparatus 50 is then utilized to form an incision that corresponds with the position of line 44d, which was disclosed as having a depth that extended through both first layer 41 and second layer 42. Accordingly, line 44d may be formed by making an incision that is similar to incision 45b. Through a similar process, incisions may be formed that correspond with the positions of incisions 44e–44g.

Figure 12:
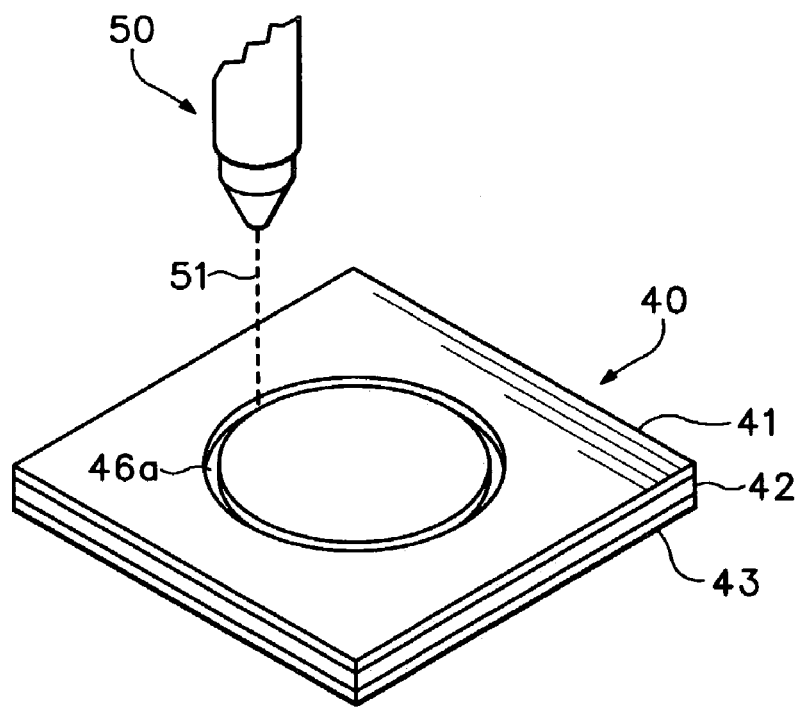
Figure 13:
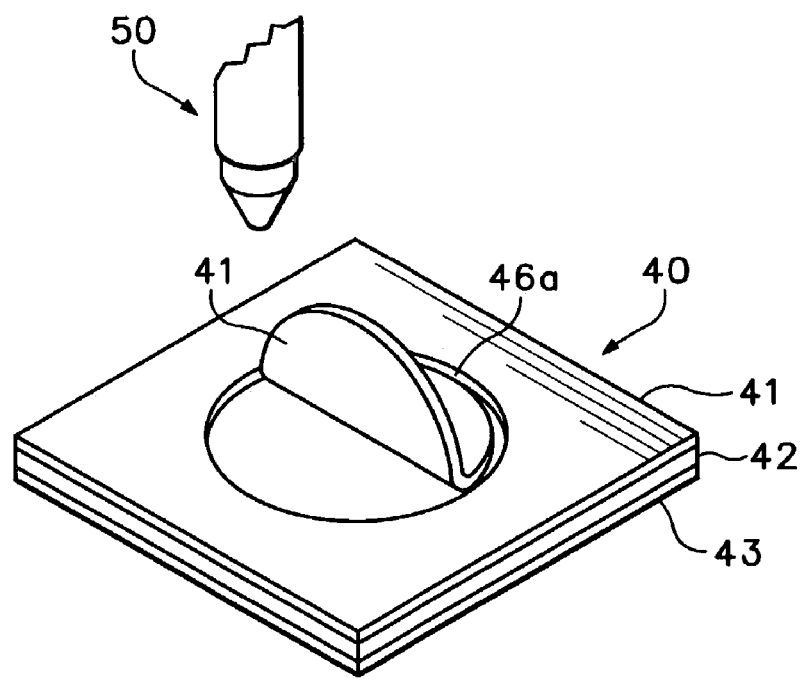

Laser apparatus 50 may also be utilized to remove areas of either first layer 41 or second layer 42. Referring to FIG. 12, laser beam 51 is depicted as inscribing a generally circular incision 46a that extends only through first layer 41 and segregates two portions of first layer 41. The material that bonds first layer 41 to second layer 42 may be an adhesive that is not fully cured at this stage in the process, or the material that bonds first layer 41 to second layer 42 may have limited strength, for example. Accordingly, layers 41–43 of stratified material 40 may be only lightly bonded (e.g., an adhesive between layers 41–43 may not be fully cured) so that the layers 41–43 may be peeled apart with little cosmetic impact. In any event, the portion of first layer 41 that is within the boundaries of incision 46a may be peeled away from second layer 42, as depicted in FIG. 13. Additional heat and pressure may then be applied to layers 41–43 to fully cure the adhesive or otherwise strengthen the bond between layers 41–43. This general procedure forms the removed area discussed relative to FIG. 4. By forming incision 46 at a depth that extends through both first layer 41 and second layer 42, the configuration discussed relative to FIG. 6 may be formed.

Figure 14:
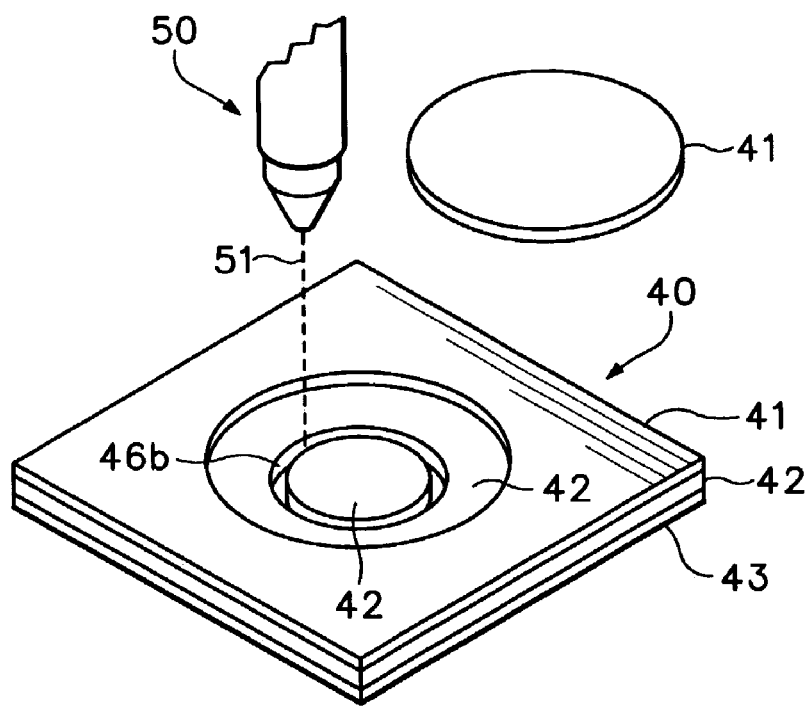
Figure 15:
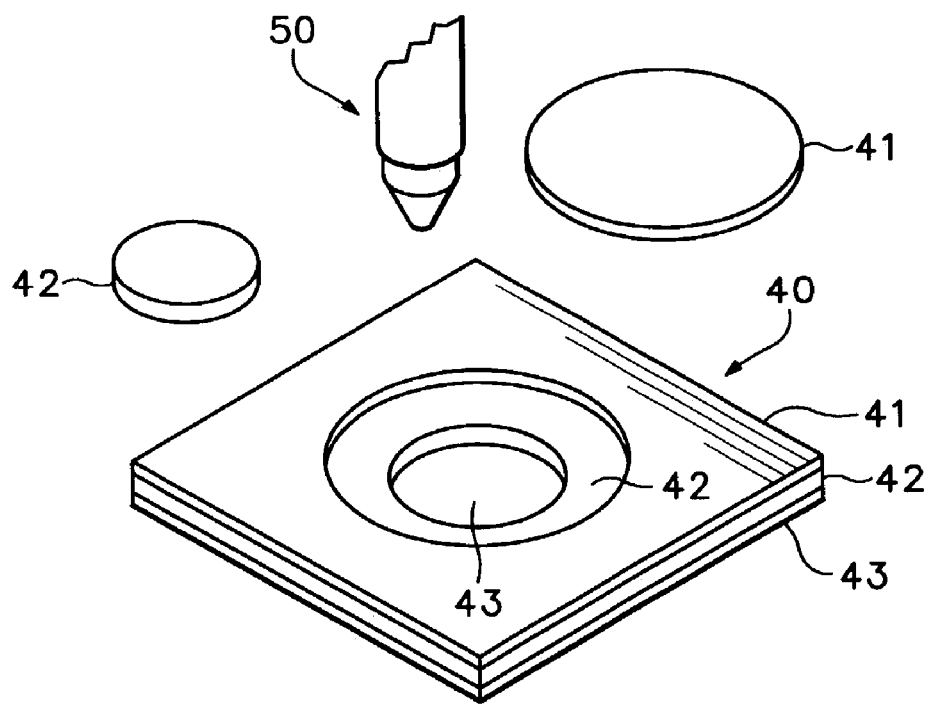

Laser apparatus 50 may then be utilized to form another generally circular incision 46b that extends through second layer 42, as depicted in FIG. 14. The portion of second layer 42 that is within the boundaries of incision 46b may be peeled away from third layer 43, as depicted in FIG. 15, to form another area of removed material. Accordingly, this general procedure may be utilized to form the removed areas discussed relative to FIG. 5.

Figure 16:
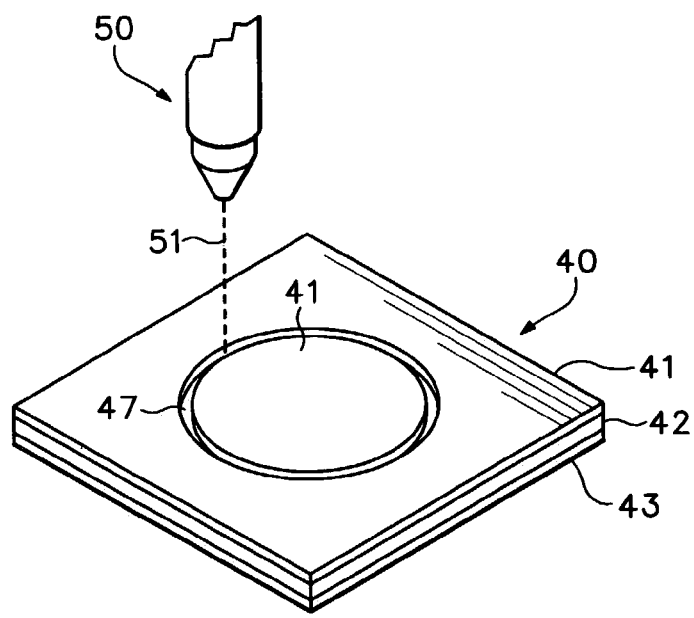
Figure 17:
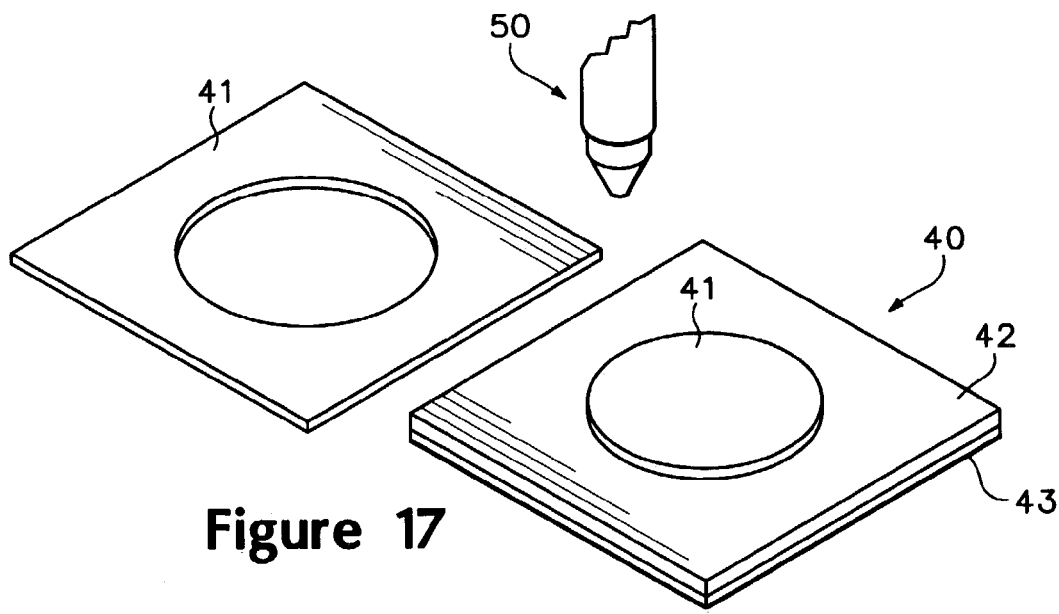

FIGS. 12–15 related to a method of removing portions of layers that are bounded by one or more incisions. The segregated portions of layers outside of the incisions may also be removed. Referring to FIG. 16, laser apparatus 50 has formed an incision 47 in first layer 41 that segregates two portions of first layer 41. The portion of first layer 41 that is outside of incision 47 may be peeled away, as depicted in FIG. 17, such that the portion of first layer 41 positioned within incision 47 remains secured to second layer 42. By utilizing this general procedure, the remaining portion of second layer 42 that is depicted in FIG. 7 may be formed.

The material that bonds first layer 41 to second layer 42 may be an adhesive that is not fully cured, as discussed above, and layers 41–43 of stratified material 40 may be only lightly bonded so that the layers 41–43 may be peeled apart following the formation of incisions. Once the final pattern is complete, stratified material 40 may be subjected to a combination of heat and pressure to completely fuse layers 41–43. Accordingly, heat and pressure may be applied to fully cure the material that bonds layers 41–43.

The general considerations discussed above with respect to FIGS. 8–11 are also applicable when removing areas of material. Accordingly, the factors that determine the depth of incisions 46a, 46b, and 47 include the power output of laser apparatus 50, the width of laser beam 51, the velocity of laser beam 51 relative to stratified material 40, and the specific materials forming stratified material 40. Furthermore, laser apparatus 50 may be configured to emit a non-combustible fluid when laser beam 51 is forming incisions 46a, 46b, and 47, thereby preventing excess burning of stratified material 40.

The above discussion discloses footwear 10 as having upper 30 formed of stratified material 40. Various portions of stratified material 40 are removed to expose underlying layers of stratified material 40. The removed portions may take the form of incisions or removed areas of material within stratified material 40. In general, the removed portions may be formed with laser apparatus 50. Accordingly, laser apparatus 50 is utilized to direct laser beam 51 at stratified material 40 and form incisions in stratified material 40. The incisions may extend through one layer of stratified lateral 40, or through multiple layers of stratified material 40.

Based upon the above discussion, portions of stratified material 40 may be removed to modify the colors of upper 30 in specific areas. Displaying various colors, however, is only one example of the many properties of upper 30 that may be modified by removing portions of first layer 41 and/or second layer 42. Further properties that may be modified include abrasion-resistance, durability, air-permeability, flexibility, and stretch-resistance, for example.

Stratified material 40 may also be formed such that first layer 41 is a synthetic leather material, second layer 42 is a nylon textile material, and third layer 42 is an elastane/polyester blend textile material. For purposes of the following discussion, the materials forming layers 41–43 will be discussed in terms of the properties of flexibility, air-permeability, and stretch-resistance. The synthetic leather material generally exhibits low flexibility, low air-permeability, and high stretch-resistance. The nylon textile material generally exhibits high flexibility, high-air-permeability, and high stretch-resistance. Similarly, the blend textile material exhibits high flexibility, high air-permeability, and low stretch-resistance. Although each of these materials are suitable for upper 30, neither of these materials are particularly suitable for each portion of upper 30.

As discussed in the Background of the Invention section above, the conventional upper may be formed by joining numerous material elements that each impart different properties to the upper. This process of forming an upper, however, requires considerable effort to join the various elements together. By forming stratified material 40 to have each of the materials, and then selectively removing selected portions of the materials, different portions of upper 30 may exhibit the properties of the remaining materials. For example, if flexibility is required in the toe area of footwear 10, various incisions may be made through first layer 41. By making incisions only in the synthetic leather material, the nylon textile material of second layer 42 and the blend textile material of third layer 43 remain and each exhibit high flexibility. Accordingly, the flexibility of the toe area may be enhanced by removing a portion of first layer 41.

Upper 30 may also benefit from having areas that permit air and water vapor to escape from the interior of footwear 10. Accordingly, areas of first layer 41 may be removed on the medial and lateral sides of upper 30 in order to permit air to flow through upper 30. By removing the areas of the synthetic textile material, therefore, the high air-permeability of second layer 42 and third layer 43 may be utilized.

Specific areas of upper 30 may also benefit from materials that stretch in the presence of a tensile force. First layer 41 and second layer 42, which are formed of stretch-resistant materials, generally do not stretch significantly. Third layer 43, however, which is formed of the blend material, exhibits a low stretch-resistance. In order to achieve the low stretch-resistance, elastane fibers, which are manufactured under the LYCRA trademark by E.I. duPont de Nemours and Company, may be incorporated into the material. Accordingly, portions of first layer 41 and second layer 42 may be removed to take advantage of the low stretch-resistance of third layer 43.

Based upon the above discussion, material may be removed from stratified material 40 to enhance the properties of upper 30 in specific portions of upper 30. Within the scope of the present invention, layers 41–43 may be formed from a plurality of materials. By forming incisions or removing areas of the layers 41–42, the beneficial properties of the various materials may be utilized. Accordingly, the properties of stratified material 40 that may be varied by laser-etching include, for example, color, abrasion-resistance, durability, air-permeability, flexibility, and stretch-resistance.

The above material discloses the concept of laser-etching stratified material 40 from a single side. That is, the general method involves placing the laser apparatus on the side of stratified material 40 that includes first layer 41 and then forming an incision from that side only. As an alternative to this general method, two lasers may be utilized to form incisions on opposite sides of stratified material 40. Accordingly, a first laser apparatus 50 is utilized to form incisions in first layer 41 and a second laser apparatus 50 is utilized to form incisions in third layer 43. In this manner, portions of layers on opposite sides of a stratified material may be removed.

When the laser-etching process is utilized on textile materials for apparel and footwear applications, for example, retaining overall air-permeability may be advantageous. An adhesive material is often applied between layers 41–43 to secure layers 41–43 together. If a uniform layer of adhesive is applied between each of layers 41–43, then the air-permeability of the resulting structure may be diminished. In order to retain a relatively high degree of air-permeability, the adhesive material may be applied as a matrix of adhesive dots that collectively secure the layers 41–43 together but also permit air to pass through layers 41–43. Alternately, discrete lines of adhesive or other pattern of adhesive may be utilized.

A variety of materials are suitable for stratified material 40. As discussed above, stratified material 40 has three discrete layers 41–43 that may be separately formed and subsequently bonded together. Another example of a suitable stratified material 40 is natural leather. Full-grain natural leather generally includes a dermis and an epidermis. The dermis is a dense, tough exterior that provides significant wear-resistance and durability. The epidermis is positioned below the dermis and gradually decreases in density as the depth extends away from the dermis. In comparison with the dermis, the epidermis is generally significantly more thick. Some natural leathers may also have a paint layer that extends over the dermis to provide an additional layer. Stratified material 40 may also be a corrected full-grain leather that has a buffed dermis to provide a uniform appearance. Another suitable material for stratified material 40 is a synthetic leather that is formed of a nonwoven with a polyurethane coating, as manufactured by Kuraray Co., Ltd. of Japan under the CLARINO trademark. Yet another suitable material for stratified material 40 is a foam layer bonded to a structure resembling natural suede that includes ultrafine fibers (e.g., 0.01 to 0.2 denier) closely intertwined into bundles, as manufactured by Toray Industries, Inc. of Japan under the ECSAINE trademark.

Although the laser-etching method is disclosed above with respect to footwear applications, the method may also be applied to a variety of other consumer products. For example, the method may be applied to apparel, such as shirts, pants, shorts, or outerwear, to enhance properties in selected areas. In addition, the method may be applied to various types of athletic equipment. Accordingly, the present invention is not limited to footwear applications, but may be applied to a wide variety of products.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

The invention claimed is:

1. A method for manufacturing an article of footwear, the method comprising steps of:
   providing a stratified material having a first layer and a second layer that are secured together;
   forming an incision in the stratified material with a laser, the incision extending through the first layer to expose the second layer, and the incision segregating a first area of the first layer from a second area of the first layer;
   removing the first area of the first layer by separating the first area of the first layer from the second layer; and
   incorporating the stratified material into an upper of the article of footwear.

2. The method recited in claim 1, further including a step of selecting the first layer and the second layer to have different properties.

3. The method recited in claim 2, wherein the step of selecting the first layer and the second layer includes choosing the different properties to be abrasion-resistance.

4. The method recited in claim 2, wherein the step of selecting the first layer and the second layer includes choosing the different properties to be air-permeability.

5. The method recited in claim 2, wherein the step of selecting the first layer and the second layer includes choosing the different properties to be flexibility.

6. The method recited in claim 2, wherein the step of selecting the first layer and the second layer includes choosing the different properties to be stretch-resistance.

7. The method recited in claim 2, wherein the step of selecting the first layer and the second layer includes choosing the different properties to be characteristics of the first layer and the second layer not including color.

8. The method recited in claim 1, wherein the step of providing the stratified material includes selecting the stratified material to have a third layer, the second layer being positioned between the first layer and the third layer.

9. The method recited in claim 8, wherein the step of forming the incision includes extending the incision through the second layer to also expose the third layer.

10. The method recited in claim 8, further including a step of forming another incision that extends through each of the first layer and the second layer to expose an underlying portion of the third layer.

11. The method recited in claim 1, further including a step of applying heat and pressure to the stratified material to bond the layers together, the step of applying heat and pressure being performed following the step of removing the first area of the first layer.

12. A method for manufacturing an article of footwear, the method comprising steps of:
   providing a stratified material having a first layer and a second layer that are non-permanently secured together;
   forming an incision in the stratified material with a laser, the incision extending through the first layer to expose the second layer, and the incision segregating a first area of the first layer from a second area of the first layer;
   removing the first area of the first layer by separating the first area of the first layer from the second layer;
   permanently securing the first layer and the second layer together following removal of the first area; and
   incorporating the stratified material into an upper of the article of footwear.

13. The method recited in claim 12, wherein the step of permanently securing includes applying heat and pressure to the stratified material to bond the layers together.

14. The method recited in claim 12, wherein the step of providing the stratified material includes applying an adhesive to an area between the first layer and the second layer.

15. The method recited in claim 14, wherein the step of permanently securing includes curing the adhesive.

16. The method recited in claim 12, further including a step of selecting the first layer and the second layer to have different properties.

17. The method recited in claim 16, wherein the step of selecting the first layer and the second layer includes choosing the different properties to be at least one of abrasion-resistance, air-permeability, flexibility, and stretch-resistance.

18. The method recited in claim 16, wherein the step of selecting the first layer and the second layer includes choosing the different properties to be characteristics of the first layer and the second layer not including color.

19. The method recited in claim 12, wherein the step of providing the stratified material includes selecting the stratified material to have a third layer, the second layer being positioned between the first layer and the third layer.

20. The method recited in claim 19, wherein the step of forming the incision includes extending the incision through the second layer to also expose the third layer.

21. The method recited in claim 19, further including a step of forming another incision that extends through each of the first layer and the second layer to expose an underlying portion of the third layer.

22. A method for manufacturing an article of footwear, the method comprising steps of:
    providing a stratified material having a first layer, a second layer, and a third layer that are secured together, the second layer being positioned between the first layer and the second layer;
    forming a first incision in one side of the stratified material with a laser, the first incision extending through the first layer to expose the second layer;
    forming a second incision in an opposite side of the stratified material, the second incision extending through the third layer to expose the second layer; and
    incorporating the stratified material into an upper of the article of footwear.

23. The method recited in claim 22, further including a stop of selecting the first layer and the third layer to have different properties than the second layer.

24. The method recited in claim 23, wherein the step of selecting includes choosing the different properties to be at least one of abrasion-resistance, air-permeability, flexibility, and stretch-resistance.

25. The method recited in claim 23, wherein the step of selecting includes choosing the different properties to be characteristics of the first layer and the second layer not including color.

26. The method recited in claim 22, further including a step of applying heat and pressure to the stratified material to bond the layers together, the step of applying heat and pressure being performed following the steps of forming the first incision and forming the second incision.

27. A method for manufacturing an article of footwear, the method comprising steps of:
    providing a stratified material having a first layer, a second layer, and a third layer that are secured together, the second layer being positioned between the first layer and the second layer;
    forming a first incision in the stratified material with a laser, the first incision extending through the first layer to expose the second layer, and the first incision segregating an area of the first layer from a remainder of the first layer;
    removing the area of the first layer by separating the area of the first layer from a portion of the second layer;
    forming a second incision in the stratified material, the second incision extending through the portion of the second layer to expose the third layer, and the second incision segregating an area of the second layer from a remainder of the second layer;
    removing the area of the second layer by separating the area of the second layer from a portion of the third layer; and
    incorporating the stratified material into an upper of the article of footwear.

28. The method recited in claim 27, further including a step of selecting the first layer, the second layer, and the third layer to have different properties.

29. The method recited in claim 28, wherein the step of selecting includes choosing the different properties to be at least one of abrasion-resistance, air-permeability, flexibility, and stretch-resistance.

30. The method recited in claim 28, wherein the step of selecting includes choosing the different properties to be characteristics of the first layer and the second layer not including color.

31. The method recited in claim 27, wherein the step of providing the stratified material includes non-permanently securing the layers together.

32. The method recited in claim 31, further including a step of permanently securing the first layer and the second layer together following removal of the area of the second layer.

33. The method recited in claim 32, wherein the step of permanently securing includes applying heat and pressure to the stratified material to bond the layers together.

34. The method recited in claim 31, wherein the step of providing the stratified material includes applying an adhesive between the first layer and the second layer and between the second layer and the third layer.

35. The method recited in claim 34, wherein the step of permanently securing includes curing the adhesive.

* * * * *

UNITED STATES PATENT AND TRADEMARK OFFICE
CERTIFICATE OF CORRECTION

| | |
|---|---|
| PATENT NO. | : 7,065,820 B2 |
| APPLICATION NO. | : 10/609010 |
| DATED | : June 27, 2006 |
| INVENTOR(S) | : James Meschter |

It is certified that error appears in the above-identified patent and that said Letters Patent is hereby corrected as shown below:

Column 13, line 29: change "second" to -- third --.

Signed and Sealed this

Fourth Day of March, 2008

JON W. DUDAS
*Director of the United States Patent and Trademark Office*